United States Patent
Sutherland

(10) Patent No.: US 9,694,729 B2
(45) Date of Patent: Jul. 4, 2017

(54) NOISE REDUCTION COATING FOR USE ON DARK COLORED FOAM

(71) Applicant: Devin J Sutherland, Royal Oak, MI (US)

(72) Inventor: Devin J Sutherland, Royal Oak, MI (US)

(73) Assignee: Magna Seating Inc., Aurora, Ontario (CA)

( * ) Notice: Subject to any disclaimer, the term of this patent is extended or adjusted under 35 U.S.C. 154(b) by 181 days.

(21) Appl. No.: 14/788,980

(22) Filed: Jul. 1, 2015

(65) Prior Publication Data

US 2016/0001687 A1   Jan. 7, 2016

Related U.S. Application Data

(60) Provisional application No. 62/020,071, filed on Jul. 2, 2014.

(51) Int. Cl.
*B60N 2/58* (2006.01)
*B60N 2/64* (2006.01)

(52) U.S. Cl.
CPC .............. *B60N 2/58* (2013.01); *B60N 2/646* (2013.01)

(58) Field of Classification Search
CPC ....................................................... B60N 2/58
See application file for complete search history.

(56) References Cited

FOREIGN PATENT DOCUMENTS

WO    02077052    10/2002

*Primary Examiner* — Timothy J Brindley
(74) *Attorney, Agent, or Firm* — Miller Canfield

(57) ABSTRACT

A seat assembly for use in an automotive vehicle includes a frame assembly for supporting a seat occupant in the vehicle, a foam pad supported by the frame assembly, and a trim cover covering the foam pad. A noise reduction coating is applied to the foam pad between the foam pad and the frame assembly to reduce noise from movement therebetween. The noise reduction coating includes a fluorescent additive from the group consisting of: vitamin A, thiamine, niacin, riboflavin, vitamin B-12, gypsum, talc, opal, agate, quartz, amber, chlorophyll, quinine, n-propanol, n-butanol, diacetone alcohol, xylene, and cresol.

4 Claims, 3 Drawing Sheets

NOISE REDUCTION COATING FOR USE ON DARK COLORED FOAM

BACKGROUND OF THE INVENTION

1. Field of the Invention

The invention relates to a coating for use on a foam pad of an automotive seat to reduce noise from movement between the foam pad and the seat frame.

2. Description of Related Art

Automotive vehicles include seat assemblies for supporting occupants within the vehicle. The seat assemblies typically include a seat cushion and a seat back operatively coupled to the seat cushion. Each of the seat cushion and seat back generally comprise a frame assembly, a cellular foam pad supported by the frame assembly and a trim cover encasing the cellular foam pad.

It is also known in the automotive seating art to spray a noise reduction coating on at least a portion of the bottom or back side of the foam pad to reduce noise which may occur due to movement between the foam pad and the frame assembly. Typically the foam pad is a yellow color and a darker colored coating is sprayed on the foam pad in order to be visibly inspected for its presence prior to assembly of the seat. However, a yellow foam pad is extremely visible through any small gaps formed in the trim cover.

Therefore, it is also desirable to have a darker colored foam pad which is not visible through gaps in the trim cover while also providing a contrasting noise reduction coating on the foam pad which is visible during inspection prior to assembly of the seat.

SUMMARY OF THE INVENTION

According to one aspect of the invention, a seat assembly is provided for use in an automotive vehicle. The seat assembly includes a frame assembly for supporting a seat occupant in the vehicle, a foam pad supported by the frame assembly, and a trim cover covering the foam pad. A noise reduction coating is applied to the foam pad between the foam pad and the frame assembly to reduce noise from movement therebetween. The noise reduction coating includes a fluorescent additive from the group consisting of: vitamin A, thiamine, niacin, riboflavin, vitamin B-12, gypsum, talc, opal, agate, quartz, amber, chlorophyll, quinine, n-propanol, n-butanol, diacetone alcohol, xylene, and cresol.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
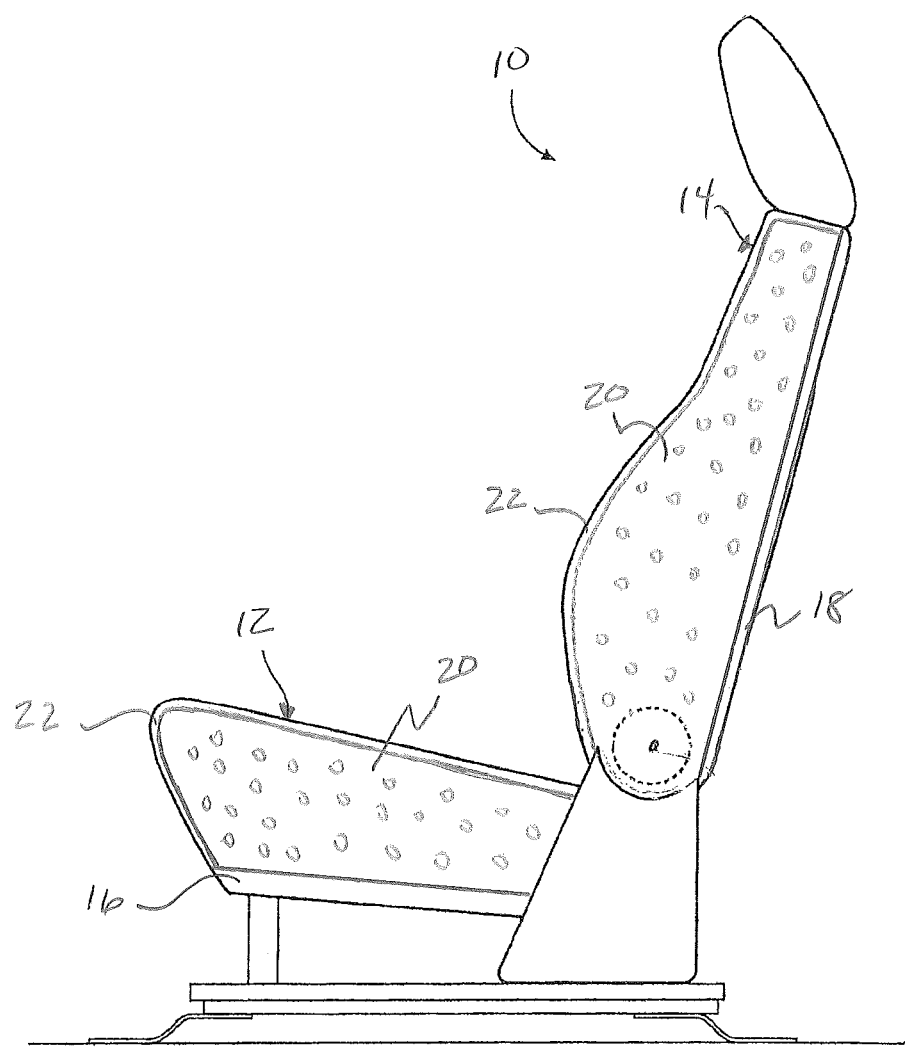
FIG. 1 is side view of a vehicle seat assembly according to one embodiment of the invention.
Figure 2:
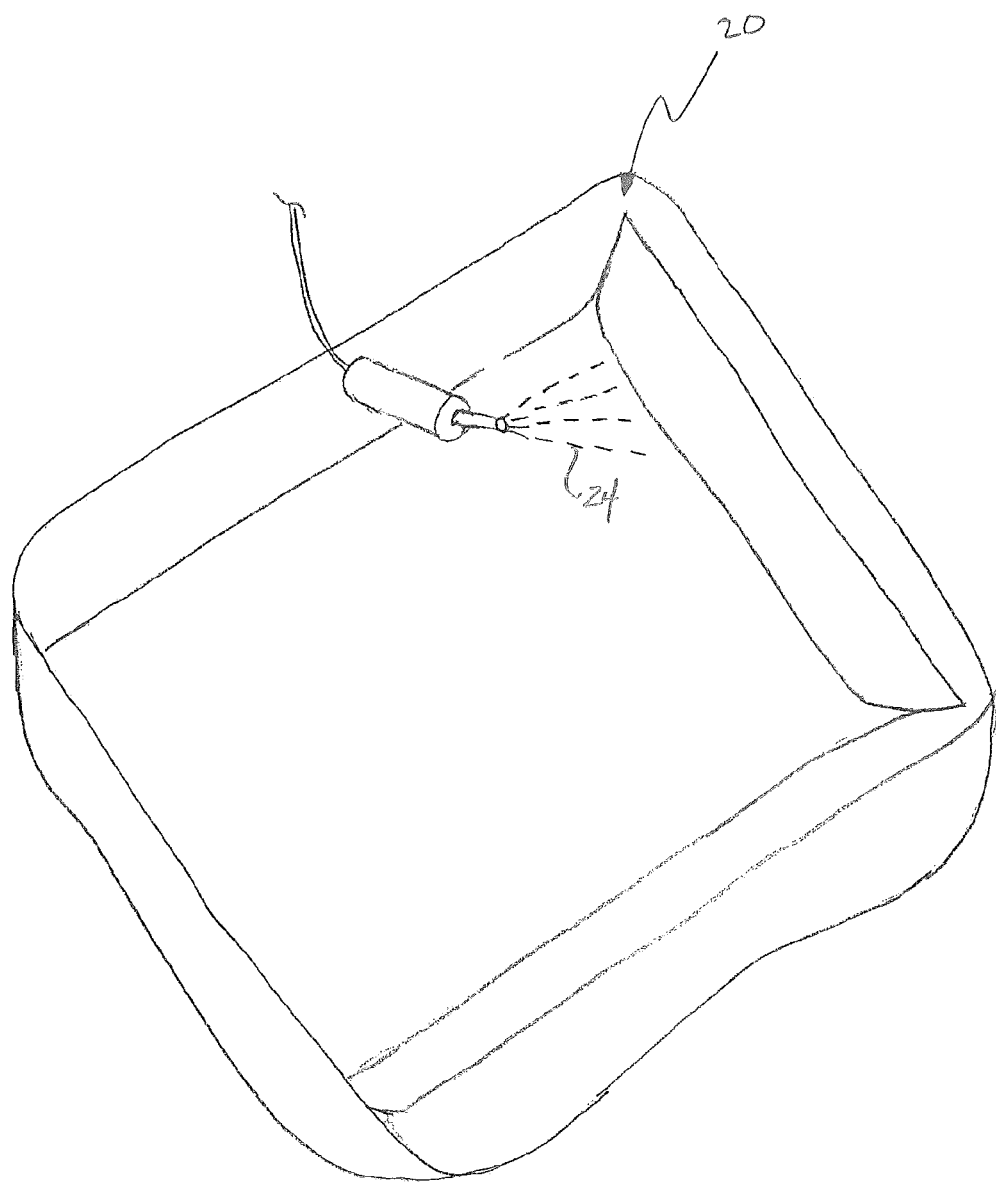
FIG. 2 is a perspective view of a foam pad of the seat assembly with a noise reduction coating and fluorescent additive sprayed on at least a portion of the foam pad.
Figure 3:
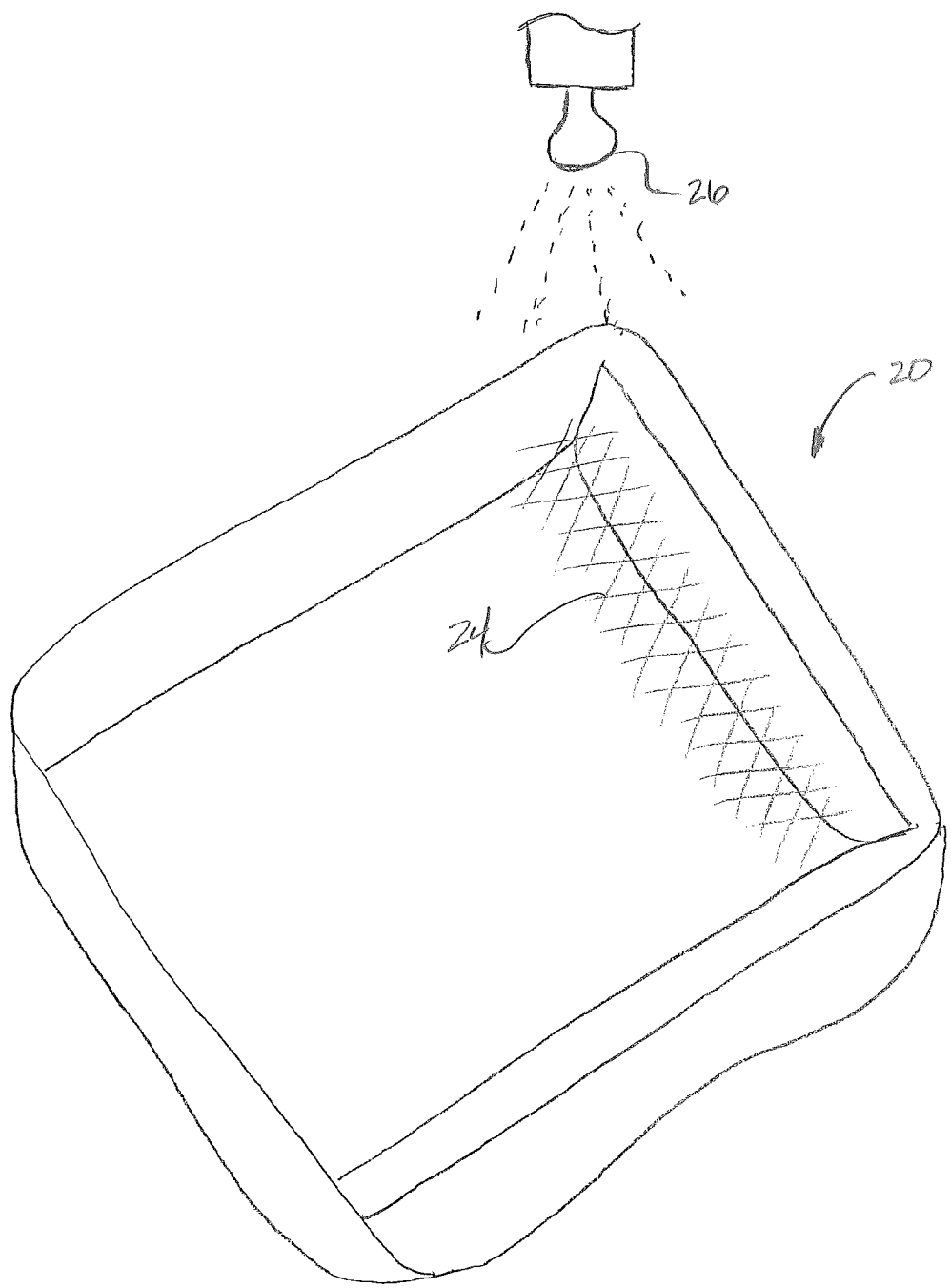
FIG. 3 is perspective view of the foam pad positioned under a black light for inspection of the application of the noise reduction coating having the fluorescent additive.

Referring to the Figures, wherein like numerals indicate like or corresponding parts throughout the several views, a seat assembly according to one embodiment of the invention for use in an automotive vehicle is generally shown at 10. The seat assembly 10 includes a generally horizontal seat cushion 12 and a generally upright seat back 14 operatively coupled to the seat cushion 12. Each of the seat cushion 12 and seat back 14 include a frame assembly 16, 18, respectively, adapted to be fixedly secured to the vehicle for supporting a seat occupant. Each of the seat cushion 12 and seat back 14 further include a cellular foam pad 20 supported by the respective frame assembly 16, 18 and encased by a trim cover 22 of cloth, leather or vinyl, as is commonly known in the art.

Currently, the cellular foam pad 20 is molded of a yellow colored polyurethane foam material and then encased by the trim cover 22. The foam pads 20 are supported by the frame assembly 16, 18 and provide resilient support to the seat occupant in the vehicle. However, friction and movement between the foam pad 20 and the frame assembly 16, 18 can cause unwanted noise in the seat assembly 10. Therefore, it is known to spray a noise reduction coating on at least a portion of the foam pad 20 which contacts the frame assembly 16, 18 to reduce the noise created by movement therebetween.

In the production and assembly of the seat assembly 10, it is desirable to visibly inspect the foam pad 20 to ensure that the noise reduction coating has been properly applied to the foam pad 20 prior to assembly of the trim cover 22. Therefore, to assist in the ease of the visible inspection, a contrasting color of the noise reduction coating is typically applied to the yellow foam pad. For example, it is common to include a blue dye to the noise reduction coating such that when the coating is sprayed on the yellow foam pad it is easily detectable during inspection and prior to full assembly of the seat assembly 10.

However, a disadvantage of using a yellow foam pad is that the foam pad 20 is extremely visible to the user through any small gaps or imperfections in the fit of the trim cover 22 to the foam pad 20. Therefore, it is now desirable to provide a darker colored foam pad 20 to more easily hide or conceal the visibility of the foam pad 20 through small gaps or imperfections in the fit of the trim cover 22 to the foam pad 20. For example, the present invention utilizes a black colored foam pad 20 encased in the trim cover 22. The black colored foam pad 20 is not easily detectable through any openings or gaps in the trim cover 22. While the black colored foam pad 20 is an improvement to the visibility problem, the blue dye applied to the noise reduction coating is difficult to detect during visual inspection to ensure it has been properly applied prior to assembly of the trim cover 22 to the foam pad 20.

Therefore, the present invention relates to including an additive to the noise reduction coating to make the coating visible on a dark colored, or in the present invention, a black foam pad 20. The additive to the coating is selected from the group of additives having fluorescent properties which are visible under a black light consisting of one or more of the following additives: vitamin A, thiamine, niacin, riboflavin, vitamin B-12, gypsum, talc, opal, agate, quartz, amber, chlorophyll, quinine, n-propanol, n-butinol, diacetone alcohol, xylene, and cresol. In the preferred embodiment, the chemical additive of quinine is added to the noise reduction coating to provide a visible color against the black foam pad 20.

It should be appreciated that a bright colored additive applied to the coating, such a yellow or white, it not desirable as the bright color against the dark foam pad 20 would also be visible through any gaps or imperfections in the trim cover 22 encased over the foam pad 20.

In use and assembly, the cellular foam pad 20 is molded to form the seat cushion and seat back. Then a noise reduction coating 24 having the fluorescent additive is sprayed onto the bottom or back side of the foam pad 20 in the areas of the foam pad 20 which are intended to contact the frame assembly 16, 18. The foam pad 20 is then placed under a black light 26 for inspection and verification of the application of the noise reduction coating 24 prior to covering the foam pad 20 with the trim cover 22. The foam pad 20 may then be encased by the trim cover 22 and installed on the frame assembly 16, 18 for completion of the seat assembly 10. The noise reduction coating 24 with the additive is not visible to the human eye and the dark color foam pad 20 is not visible through any gaps or imperfections in the fit of the trim cover 22 to the foam pad 20. The coating 24 also reduces any noise occurring from movement between the foam pad 20 with the frame assembly 16, 18 of the seat assembly 10.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. A seat assembly adapted for use in an automotive vehicle comprising:
   a frame assembly for supporting a seat occupant in the vehicle;
   a foam pad supported by said frame assembly;
   a trim cover covering said foam pad;
   and a noise reduction coating applied to said foam pad between said foam pad and said frame assembly to reduce noise from movement therebetween, said noise reduction coating including a fluorescent additive from the group consisting of: vitamin A, thiamine, niacin, riboflavin, vitamin B-12, gypsum, talc, opal, agate, quartz, amber, chlorophyll, quinine, n-propanol, n-butanol, diacetone alcohol, xylene, and cresol.

2. The seat assembly as set forth in claim 1 wherein said noise reduction coating is visible on said foam pad under a black light.

3. The seat assembly as set forth in claim 2 wherein said foam pad is a black cellular foam pad of polyurethane.

4. The seat assembly as set forth in claim 3 wherein said fluorescent additive of said noise reduction coating is quinine.

* * * * *